April 11, 1950  E. P. PALMATIER  2,503,451
DEICING SYSTEM FOR AIRCRAFT SURFACES
Filed Jan. 11, 1944  3 Sheets-Sheet 1
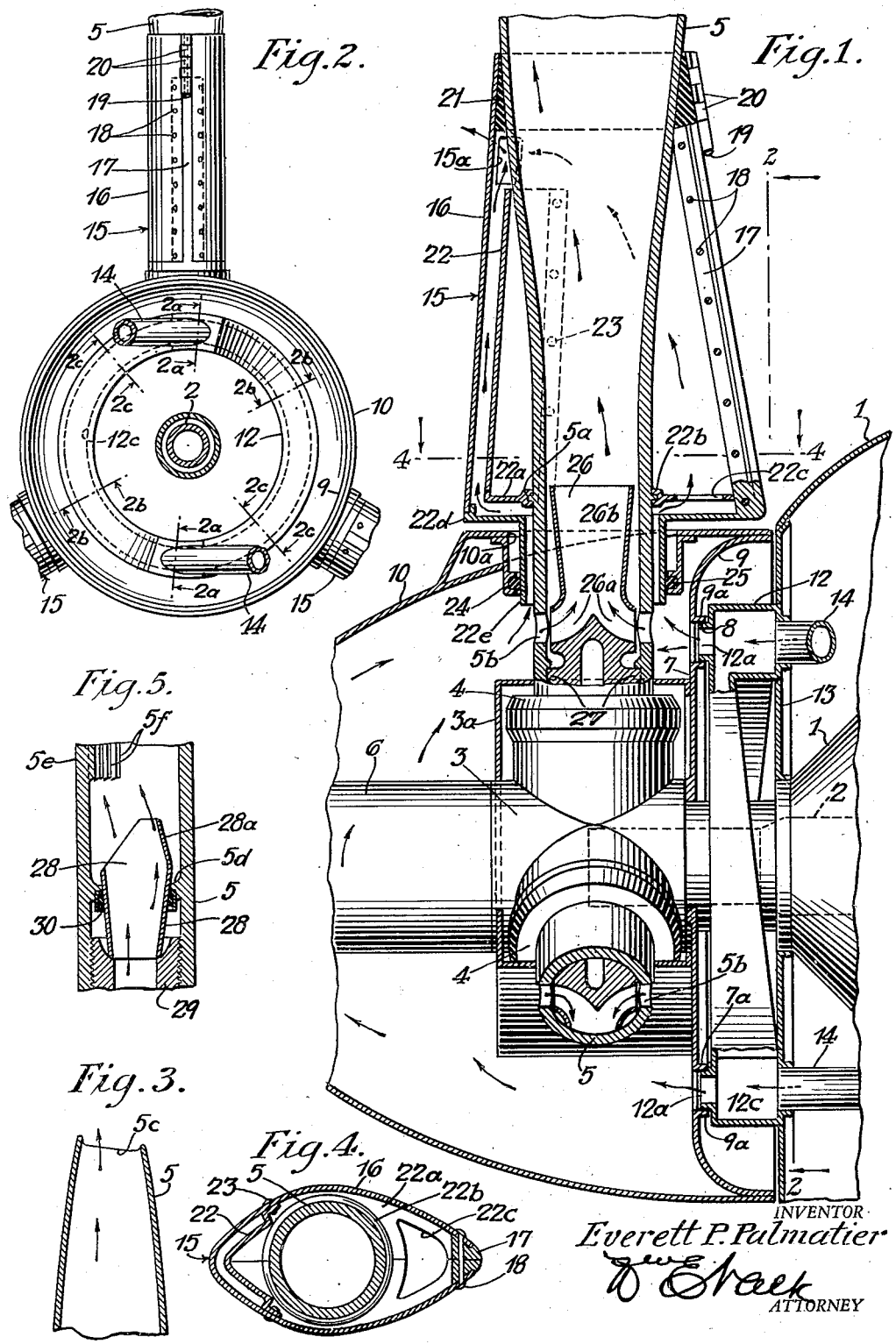
INVENTOR
Everett P. Palmatier
ATTORNEY

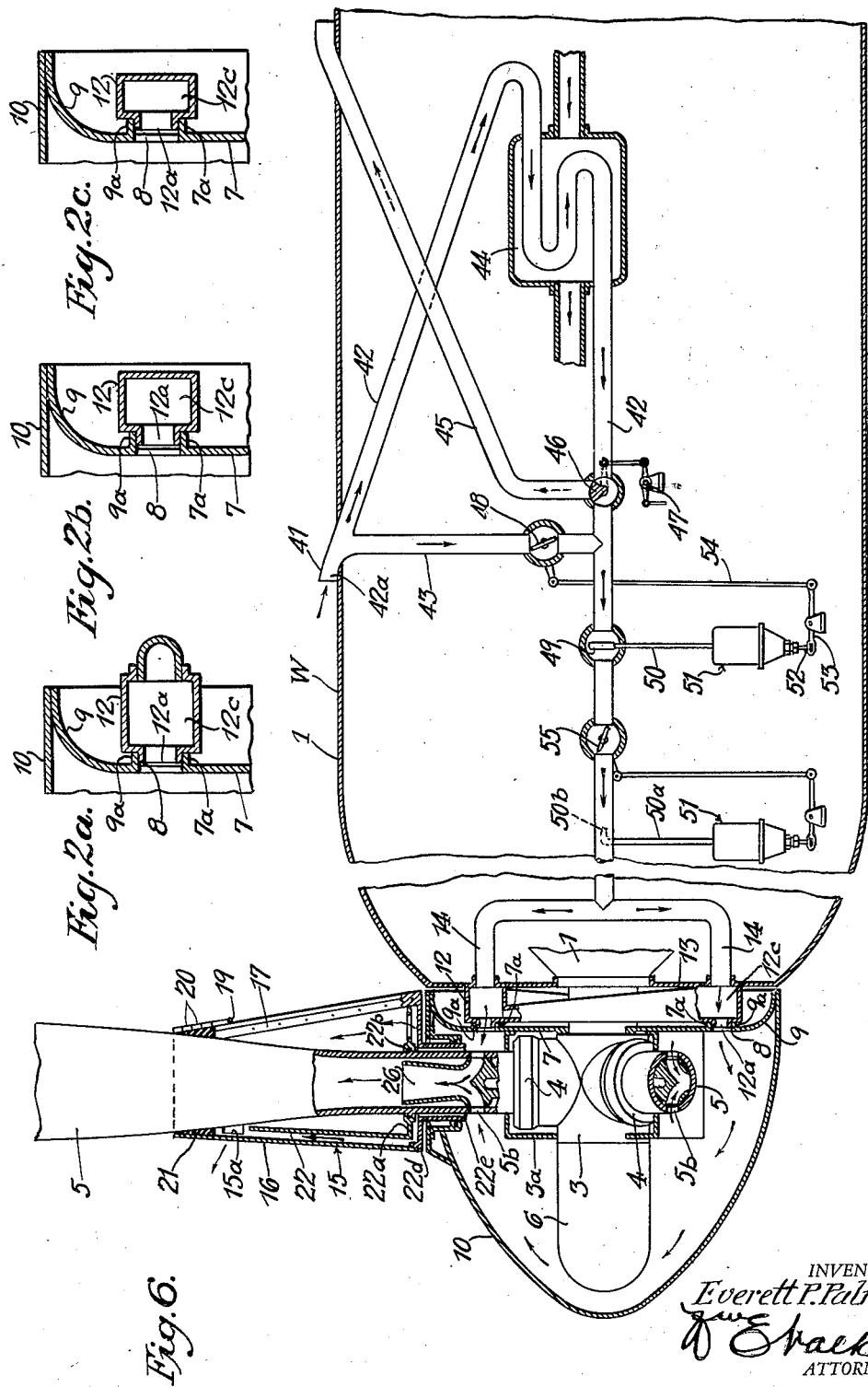

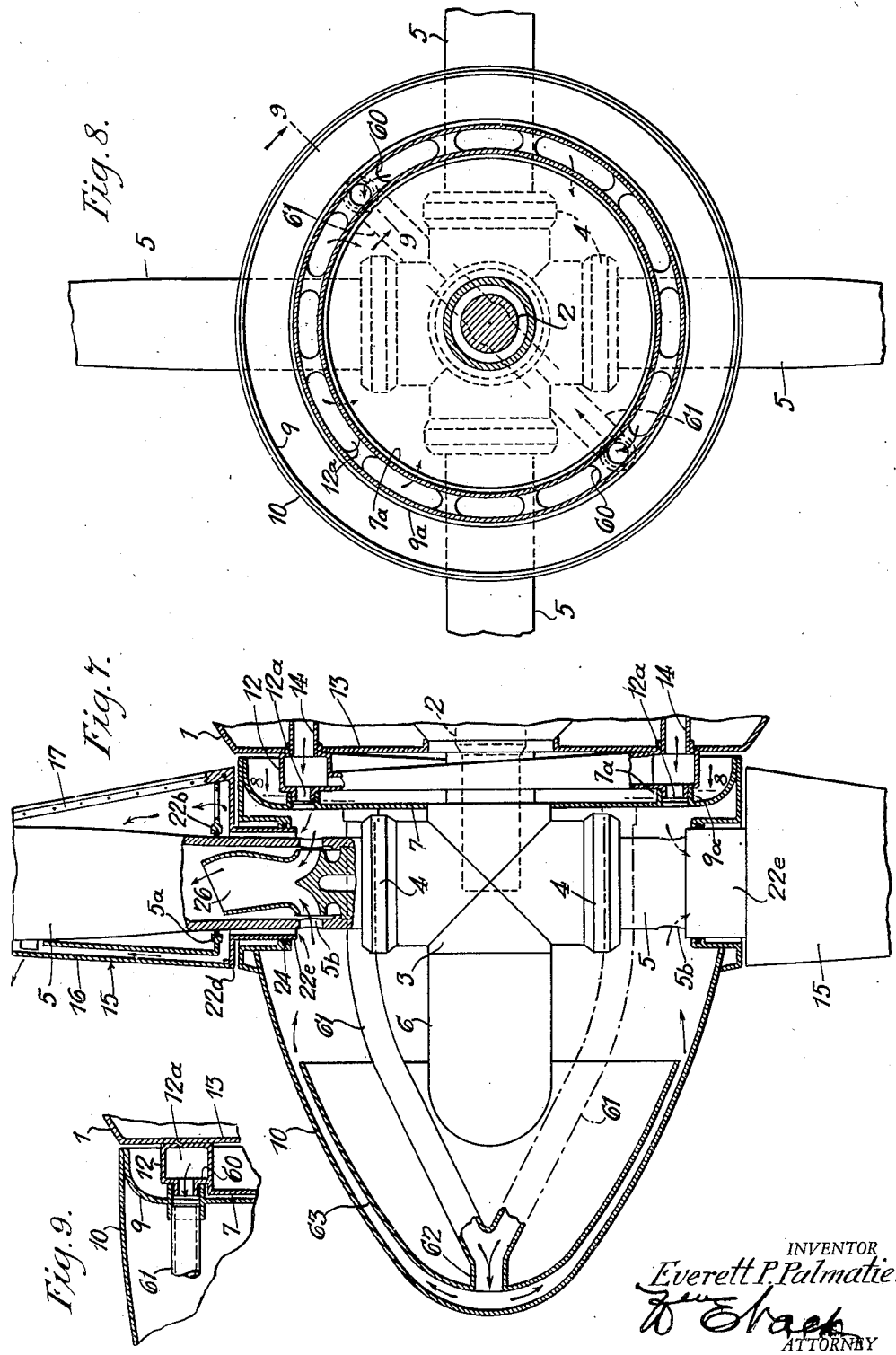

Patented Apr. 11, 1950

2,503,451

UNITED STATES PATENT OFFICE 2,503,451

DEICING SYSTEM FOR AIRCRAFT SURFACES

Everett P. Palmatier, Upper Montclair, N. J., assignor to Curtiss-Wright Corporation, a corporation of Delaware Application January 11, 1944, Serial No. 517,874

4 Claims. (Cl. 244—134)

My invention relates to a system for de-icing rotatable aircraft surfaces.

In accordance with my invention, the space enclosed by the aircraft spinner serves as a chamber from which a hot gaseous medium is passed to the propeller blades and the blade cuffs.

It is a feature of my invention that the propeller blades and/or blade cuffs are subjected, in a novel manner, to the action of a hot gaseous medium for de-icing purposes.

It is a further feature of my invention that the respective streams of hot gases passing through a hollow propeller blade and blade cuff are deflected toward the leading edges of said blade and cuff.

Various other objects and advantages of my invention will become apparent from the following detailed description.

My invention resides in the art, system and arrangements for de-icing rotatable aircraft surfaces as hereinafter described and claimed.

For an understanding of my invention and for an illustration of one of the many forms thereof, reference is to be had to the accompanying drawings, in which:

Figure 1 is a vertical sectional view, partly in elevation, showing a de-icing arrangement as constructed in accordance with my invention;

Fig. 2 is a transverse, vertical sectional view, partly in elevation, taken on the line 2—2 of Fig. 1 looking in the direction of the arrows;

Figs. 2a, 2b, 2c are transverse sectional views taken on the respective lines 2a—2a, 2b—2b and 2c—2c of Fig. 2;

Fig. 3 is a fragmentary sectional view showing the end of a propeller blade;

Fig. 4 is a transverse, horizontal sectional view taken on the line 4—4 of Fig. 1 looking in the direction of the arrows;

Fig. 5 is a sectional view, partly in elevation, showing a modified feature of the invention;

Fig. 6 is a schematic view showing an air heatin system for the spinner, propeller blade and blade cuff arrangement of the invention;

Fig. 7 is a vertical sectional view, partly in elevation, showing an additional feature of the invention;

Fig. 8 is a transverse sectional view, partly in elevation, taken on the line 8—8 of Fig. 7 looking in the direction of the arrows; and Fig. 9 is a sectional view taken on the line 9—9 of Fig. 8 looking in the direction of the arrows.

Referring to Fig. 1, I have shown the nose 1 of an aircraft engine having the propeller shaft 2 extending therefrom. Secured in known manner to the shaft 2 is the propeller hub 3 which comprises a plurality of radially extending sockets 4 for the respective propeller blades 5. If desired, but by no means necessarily, a heat-protective box or housing 3a may be disposed around the hub 3, this housing 3a being provided with passages through which the respective propeller blades 5 extend. As herein shown, the hub 3 has secured to the forward end thereof a housing 6 within which is disposed the motor and other mechanism utilizable for changing the pitch of the propeller blades 5 as known in the art.

Bolted or otherwise suitably secured to a rear section of the hub 3 is a disk 7 terminating in a circular flange 7a concentrically disposed with respect to the propeller shaft 2. Spaced from the flange 7a to thereby form a circular slot 8 is a circular flange 9a of a curved member 9, the flanges 9a being concentrically disposed with respect to the flange 7a and said member 9 being secured in suitable manner to the rear section of the spinner 10 which is attached in known manner to the hub 3 so as to be rotatable therewith as a unit. As hereinafter described, the flanges 7a and 9a should be secured to each other in suitable manner, as by spaced connecting webs.

Disposed in the aforesaid slot 8 is the circular passage-forming extension 12a of a circular housing 12 secured in fixed position in any suitable manner, as by a disk 13 attached thereto and to the engine nose 1. The flanges 7a, 9a are disposed closely adjacent the respective walls of the extension 12a and, preferably, packings or other suitable sealing means, not shown, are disposed between adjacent surfaces defined by said flanges and walls. Communicating with the housing 12 is or are one or more pipes 14 through which a heated gaseous medium is supplied in suitable manner to said housing 12 as hereinafter described.

As herein shown, each of the propeller blades 5 has associated therewith a cuff 15 which is formed from a metallic shell 16 shaped into cuff formation. At the trailing edge of the cuff, the two edges of the shell 16 are attached together by a coupling member 17, said shell edges and the member 17 being secured together by rivets 18. The coupling member 17 terminates short of the outer end of the cuff and, in this area, the trailing shell edges are secured together by a pin 19 which extends through cylindrical members 20 alternately formed on said cuff edges, respectively. The outer end of each cuff 15 has associated therewith a sealing member 21 formed preferably of rubber, this sealing member 21 engaging the adjacent propeller blade surface and anchoring the upper end of the cuff 15 in operative position.

Each cuff 15 further comprises a member 22 disposed interiorly of the shell 16 at the leading cuff edge and spaced therefrom in generally parallel relation, the shell 16 being secured to the member 22 by rivets 23, or equivalent.

As regards each cuff 15, the member 22 thereof is seated on a plate 22a which may be formed integrally with the aforesaid coupling member 17. The plate 22a is formed with an opening which is defined by a circular section 22b having U-configuration. The associated propeller blade 5 extends through this opening and the U-section 22b cooperates with a flange 5a formed exteriorly on said propeller blade 5 to thereby support the associated cuff 15 in operative position. As shown particularly in Fig. 4, the plate 22a comprises an opening 22c utilizable as hereinafter described.

Formed as an integral part of the structure consisting of the coupling member 17 and the plate 22a is a plate 22d upon which the aforesaid shell 16 is seated. This plate 22d comprises a tubular section 22e which extends inwardly in spaced relation with respect to the exterior surface of the associated propeller blade 5, each tubular section 22e extending through an opening 10a formed in the spinner 10.

Concentrically disposed with respect to the tubular section 22e of each plate 22d and secured in suitable manner to the adjacent surface of the spinner 10 is a tubular member 24 which, in suitable manner, carries a circular packing or sealing member 25 related, in sealing relation, with the adjacent surface of said tubular section 22e of the plate 22d.

I have hereinbefore stated that the coupling member 17, the plates 22a and 22d together with the tubular section 22e are an integral structure. This, in effect, is an accurate statement. However, in actual practice and as indicated in Fig. 4, it will be understood that the aforesaid structure will consist of separate parts which are assembled in operative relation and then suitably secured together.

In view of the foregoing description, it will be understood that each cuff 15 including the plate 22d and tubular section 22e thereof are secured to each propeller blade 5 for movement therewith as a unit. Accordingly, during a pitch-changing operation, the aforesaid tubular section 22e of each plate 22d moves rotatably with respect to its gasket 25 and the associated tubular member 24, said gasket 25 maintaining a sealed joint at all times between these relatively movable parts.

In accordance with the invention, the propeller blades 5 are of the hollow passage-forming type and the shank of each blade 5 comprises one or more passages 5b extending transversely therethrough. Further, as indicated in Fig. 3, each of the blades 5, at or adjacent its outer end, comprises a vent or passage 5c open to the atmosphere.

As indicated in Fig. 1, each of the propeller blades 5 may have a diffuser 26 secured interiorly thereof in suitable manner, as by the interlocking circular tongues 27 formed thereon and on the interior blade surface, respectively. As shown, the deflector 26 comprises channels 26a which are alined with the respective passages 5b formed in the propeller blade shank. These channels 26a form diverging paths which merge into the main diffuser channel 26b which also forms a path diverging in a direction leading toward the tip of the blade.

During flight of the aircraft and when it becomes necessary to subject the propeller blades 5 and the cuffs 15 to a de-icing operation, streams of heated air or other hot gases pass, by way of the respective pipes 14, into the fixed housing 12. From said housing 12, the hot gases pass, by way of the housing extension 12a, into the chamber defined by the rotating spinner 10.

From this chamber, one stream of the hot gases passes through the passages 5b of each blade 5, through each diffuser 26 and then through each blade 5, the stream of hot gases emerging from each blade 5 by way of the vent 5c formed at the end thereof. As will be understood, the hot gases are drawn into and through the propeller blades 5 by centrifugal action in response to rotation thereof and such centrifugal action of the propeller blades 5 is applied to the hot gases in the spinner 10, the housing extension 12a, the housing 12 and the pipes 14 although, as hereinafter described, there should be a source of positive pressure which causes the hot gases to move through the pipes 14 toward the housing 12. The diffuser 26 is advantageous because the channels 26a and 26b thereof, as stated, form diverging paths which decrease the velocity of the hot gases. For a given volume of hot gases passing into the blade per unit of time, the blade passages 5b may have smaller crosssectional area if said diffuser 26 is employed as described.

From said chamber defined by the spinner 10, another stream of hot gases passes outwardly into each cuff 15 by way of the passage formed between the tubular section 22e and the adjacent propeller blade surface. In each cuff, the hot gases flow through the opening 22c of the plate 22a and through the channel defined by the shell 16 and member 22, such hot gases passing outwardly toward the sealing member 21, the hereinbefore described member 22 serving to deflect a substantial volume of the hot gases toward the leading cuff edge which is particularly vulnerable when icing conditions exist. Eventually, all of the hot gases entering each cuff 15, as described above, pass to the atmosphere by way of a vent 15a formed adjacent the outer cuff end.

As regards the cuffs 15, it will be understood that, to some extent, they function, by centrifugal action, to draw the hot gases therethrough. However, when cuffs are de-iced in accordance with the invention, the source of positive pressure which causes the hot gases to flow through the pipes 14 should be such as insures the establishment in the spinner 10 of the necessary gas pressure for causing flow of gases outwardly through the cuffs.

As a result, the blades 5 and the cuffs 15, for de-icing purposes, are simultaneously subjected to the action of the hot gases. As regards the spinner 10, it may be de-iced to some extent with the arrangement shown in Fig. 1 by reason of the fact that some of the hot gases passing into the chamber defined thereby flow into engagement with the front spinner surface. A substantial volume of the hot gases passes by substantially direct paths into the blades 5 and cuffs 15 to thereby effectively heat these surfaces for de-icing purposes. In the cuffs 15, by reason of the presence of the respective members 22, the heating action of the hot gases is highly effective at the respective leading edges thereof.

It will be understood that the space defined by the spinner 10 is sealed, entirely or substantially so, from the atmosphere at all times with the exception of the propeller blade vents 5c, the cuff vents 15a and the inlet ports thereto by way of the pipes 14. The packing 25 seals the joints between the respective sets of tubular sections 22e and tubular members 24. However, during a pitch-changing operation, each tubular section 22e moves rotatably with respect to its associated packing 25 while maintaining a sealing relation.

Referring to my invention as illustrated in Fig. 5, I have shown a hollow propeller blade 5 having an inner circular flange 5d which, in suitable manner, has secured thereto a member 28 serving as a combined diffuser-deflector which may rest upon a blade gear 29 threaded interiorly of said blade 5, a member 30 being utilized for establishing a suitable joint at the blade flange 5d. In accordance with the invention, the deflector 28 comprises an angular section 28a utilizable for deflecting hot gases toward the leading blade edge 5e, this being the blade edge which is particularly susceptible to icing conditions. In addition, the member 28 has the desirable function of decreasing the velocity of the hot gases passing into the blade 5 by way of the blade passages 5b.

In order to accelerate the rate at which heat is transferred from the hot gases to the material forming the leading blade edge, a plurality of fins 5f or the like may be formed interiorly of the blade 5 throughout all or a part of the area last described. It will be understood that the arrangement of Fig. 5 is particularly advantageous from the de-icing viewpoint, this being true by reason of the fact that the hot gases are effectively directed toward the leading blade edge while the fins 5f serve advantageously in connection with the transfer of heat to the desired blade area.

Referring to Figs. 1, 2, 2a, 2b and 2c, it is a feature of the invention that the aforesaid circular housing 12 defines two communicating chambers 12c, 12d which are duplicates of each other. The lower conduit 14, Fig. 2, passes hot gases principally into the chamber 12c at the end thereof having maximum cross-sectional area. Continuing in a clockwise direction, Fig. 2, through the chamber 12c, it will be noted that the cross-sectional area thereof decreases in a progressive manner, Figs. 2a, 2b and 2c, said chamber 12c having its smallest cross-sectional area at the end thereof which communicates with the end of the chamber 12d having maximum cross-sectional area. The upper conduit 14, Fig. 2, passes hot gases principally into the chamber 12d at the end thereof having maximum cross-sectional area. Continuing in a clockwise direction, Fig. 2, through the chamber 12d, it will be noted that the cross-sectional area thereof decreases in the same manner as does the chamber 12c, said chamber 12d having its smallest cross-sectional area at the end thereof which communicates with the end of the chamber 12c having maximum cross-sectional area.

The hot gases pass into the rotating spinner 10 from the housing 12 through the circular extension 12a and, with a chamber arrangement of the character described above, the tangential component of velocity of the hot gases is maintained at or in a constant ratio to the tangential velocity of the rotating spiner and other parts. This maintains a constant direction of velocity relative to the rotating parts and/or the passage through the circular extension 12a so that there will be a minimum restriction to the flow of the hot gases.

In my copending application Serial No. 503,143, filed September 20, 1943, I have disclosed a heat-exchange system utilizable for supplying heated air for de-icing purposes. Such a system is diagrammatically illustrated in Fig. 6 wherein I have shown an aircraft surface W which, for example, may be a surface of a wing. Projecting in the normal direction of aircraft flight is an air scoop 41 having pipes 42 and 43 branching therefrom. The air scoop 41, then, is at the inlet end 42a of the pipe 42 and it serves as a source of positive pressure to establish a flow of air therethrough, this air, eventually, being discharged from said pipe 42 into the pipes 14, Figs. 1 and 2, which, as previously described, communicate with the housing 12. As shown, the pipe 42 extends through a heating zone 44 and, beyond said zone, said pipe 42 is adapted to communicate with a pipe 45 which branches from the pipe 42 and terminates above the aforesaid surface W in opposite facing direction as regards the air scoop 41. Disposed at the junction of the pipes 42 and 45 is a valve 46 controlled by a device 47.

The pipe 43, as stated, communicates with the pipe 42 at the air scoop 41. The other end of said pipe 43 returns to and communicates with the pipe 42 in a section thereof beyond the zone where the pipe 45 communicates therewith. As shown, the pipe 43 has a valve 48 included therein.

Disposed in the pipe 42, beyond the section thereof with which the pipe 43 communicates, is a suitable temperature-responsive device such, for example, as a thermal bulb 49 which has communicating therewith a pipe 50 extending in sealed relation through and into the pipe 42.

The pipe 50 communicates with suitable control mechanism 51 such, for example, as described in my aforesaid pending application Serial No. 503,143, filed September 20, 1943. The control mechanism 51 comprises a depending rod 52 which is secured to one end of a suitably mounted pivoted lever 53, the other end of which is secured to the lower end of a link 54 secured, at its upper end, to the actuating handle of the aforesaid valve 48.

The bulb 49, the pipe 50 and a space within the control mechanism 51 are filled with a suitable control medium, either vapor, liquid or a gas. The temperature of the control medium in the bulb 49, as determined by the temperature of the air flowing through the pipe 42, determines the position of the coupled movable system comprising the rod 52, lever 53, link 54 and valve 48.

The pipe 42, beyond the aforesaid bulb 49, is shown as having included therein a valve 55, the position of which is rendered dependent upon the quantity (pounds) of air passing, per unit of time, through said pipe 42 beyond said valve 55. Any suitable mechanism may be utilized for controlling the position of the valve 55 and, for purposes of explanation, I have illustrated the quantity control mechanism for the valve 55 as being a duplicate of that used for controlling the valve 48, the same reference characters being applied, respectively, to duplicate parts. As will be noted, the pipe 50a of the quantity control mechanism 51 comprises an angular inlet section 50b extending longitudinally along the pipe 42, the open end thereof facing the oncoming air stream.

In normal operation, the valve 46 is so positioned that the pipe 45 is in non-communicating relation with the pipe 42. During flight of the aircraft, the air scoop 41 continuously supplies air to the inlet end 42a of the pipe 42 and also to the inlet end of the pipe 43. As a result, air passes continuously through the pipe 42 toward the pipes 14 and, while passing through the heat-exchange zone 44, the temperature of the air is elevated by heat obtained from the exhaust gases.

The valve 48 is normally partially or entirely closed but in the event that the air passing through the pipe 42 becomes warmer than desired, the temperature-responsive control mechanism 51 is actuated by the thermal bulb 49 to produce upward movement of the link 54 whereby the valve 48 is opened sufficiently to permit the proper quantity of cool air to flow from pipe 43 to pipe 42 to reduce the temperature of the heated air passing through said pipe 42.

In the event that the quantity of air traversing the pipe 42 is larger than desired, the air pressure in the pipe 50a increases to thereby actuate the quantity control mechanism 51 to effect upward movement of the associated link 54 whereby, as a result, the valve 55, which is normally open, is moved toward a closed position.

In the event that the heat-exchange device hereinbefore described becomes unduly heated, the valve 46 may be operated to close off that section of the pipe 42 to the left thereof, Fig. 6, and to open communication of the pipe 45 with that section of said pipe 42 at the right of the valve 46. As a result, there is an increased flow of cold air through the heat-exchange device by way of the pipes 42 and 45 whereby the temperature of said heat-exchange device is lowered.

With respect to Fig. 6, it shall be understood that the invention is not to be limited to the use of either or both of the control mechanisms 51, the valve 55, the valve 48 together with the pipe 43 and the valve 46 together with the pipe 45.

Hence, Fig. 6 is illustrative of the broad idea of passing a stream of heated air or other hot gases into engagement or heat-exchange relation with an aircraft surface to be de-iced in response to the application to said stream of two pressure effects, namely, (1) positive pressure, whether generated by an air scoop, a pump, or equivalent and (2) negative pressure, i. e., the centrifugal action of the propeller blades and also of the propeller blade cuffs, if used and if desirable. In other words, in the disclosed form of the invention, a path for de-icing air extends from the inlet end 42a of the pipe 42, thence by way of the pipe 42, pipes 14, housing 12, the chamber defined by the spinner 10, the blade passages 5b, the diffuser 26 into engagement with the interior surfaces of the propeller blades 5. The centrifugal action of the propeller blades 5 is effective throughout a length of this path leading backward from said propeller blades whereas the pressure rendered effective by the air scoop 41, or equivalent, is effective throughout a length of said path leading forward from the inlet end 42a of the pipe 42. Throughout an intermediate length of said path, both effects are present and active.

Referring to Fig. 8, I have shown the hereinbefore described flanges 7a and 9a as having spaced connecting webs 60 associated therewith and secured thereto. Received and supported in a pair of the webs 60, diametrically opposite each other, are the ends of the respective pipes 61 which extend forwardly through the spinner 10. The pipes 61 join each other in a neck 62 which extends through a shell 63 conforming generally with the interior front surface of said spinner 10, said shell 63 being spaced from the spinner 10 and secured thereto in suitable manner.

It will be understood that the pipes 14 forming a part of the arrangement of Figs. 7 and 8 are traversed by heated air or hot gases which is supplied thereto in suitable manner, for example, as illustrated in Fig. 6. If so, it will be understood that the heated air and hot gases pass through the propeller blades 5 of Figs. 7 and 8 in response to the application thereto of two effects, namely, the pressure generated at the air scoop and the centrifugal action of the propeller blades. Simultaneously, the same two effects cause heated air or hot gases to pass from the housing 12 through the pipe 61 and thence into the space between the shell 63 and the interior front surface of the spinner 10, such heated air or hot gases passing into the spinner chamber proper from the ends of the shell 63 and thereafter passing to the atmosphere either by way of the propeller blades 5 or the cuffs 15. In this manner, the heated air or hot gases is or are effectively applied to the spinner nose for de-icing purposes.

Although in a preferred form of my invention, the hot gaseous medium which is passed into the spinner 10 is heated air which is obtained in the manner described in my aforesaid pending application Serial No. 503,143, filed September 20, 1943, it shall be understood that my invention is not to be thus limited. Thus, for example, the heated air may be obtained in any other suitable manner and, moreover, the invention is not to be limited to the use of heated air since other heated mediums such, for example, as the hot exhaust gases of the aircraft engine may be used for de-icing purposes in accordance with a broad application of my invention.

In the appended claims, the expression "de-icing" shall be understood as describing true de-icing wherein that ice is melted which, previously, had been formed on the described rotating aircraft surfaces, i. e., the propeller blades 5, the spinner 10 or the cuffs 15 and said expression shall also be understood as describing an operation wherein said aircraft surfaces are subjected to the action of a hot gaseous medium in order to positively prevent the formation of ice thereon.

Although I have shown de-icing systems for a rotatable system comprising a spinner, propeller blades and associated cuffs, it shall be understood, except as limited by the appended claims, that my invention is not to be limited to the use of cuffs with the respective propeller blades.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination, a hollow propeller blade and an associated cuff, said blade having an inlet opening in the shank thereof and a vent at or adjacent the tip thereof, said cuff having an inlet opening at the inner end thereof and a vent adjacent its tip, means for supporting said blade and cuff for rotatable movement, means for supplying streams of hot gases which pass through the respective inlet openings of said blade and cuff for subsequent discharge to the atmosphere by way of the respective vents, and means for directing the respective streams of hot gases toward the blade and cuff leading edges.

2. In a de-icing system for a propeller having a blade and a hollow cuff on the blade shank, the leading edge of said cuff being subject to ice accretion in operation, a baffle within the cuff defining with the inner surface thereof a thin passage whose surface is substantially co-extensive in length with the cuff and substantially co-extensive in width with the leading edge portion of the cuff which is subject to ice accretion and whose depth is substantially uniform and less than said width, means to feed hot gas to one end of said cuff passage for substantially laminar flow through the passage and over the surfaces of said cuff and baffle and means to provide egress of said hot gas from the other end of said cuff passage.

3. In a de-icing system for a propeller having a hollow spinner and hollow blades, means to introduce hot gas within the spinner, means to confine the hot gas entering the spinner to the inner surface thereof at that part of the spinner which is subject to ice accretion, and a nozzle in each blade shank for conducting hot gas from said spinner hollow to the blade hollows, said nozzles being disposed to direct hot gas entering the blade hollows along the interior of the blade leading edges, said blades having ports for exit of hot gas.

4. In a de-icing system for a propeller having a hollow spinner and hollow blades, means to introduce hot gas within the spinner, means to confine the hot gas entering the spinner to the inner surface thereof at that part of the spinner which is subject to ice accretion, and a nozzle in each blade shank for conducting hot gas from said spinner hollow to the blade hollows, said nozzles being disposed to direct hot gas entering the blade hollows along the interior of the blade leading edges, said blades having ports for exit of hot gas, the inner surface of said blade leading edge having a plurality of projections thereon in contact with the hot gas stream to augment heat transfer between the blade materials and the hot gas.

EVERETT P. PALMATIER.

REFERENCES CITED

The following references are of record in the file of this patent:

UNITED STATES PATENTS

| Number | Name | Date |
|---|---|---|
| 1,864,438 | Janson | June 21, 1932 |
| 1,879,717 | Sikorsky | Sept. 27, 1932 |
| 1,899,689 | Houston | Feb. 28, 1933 |
| 1,942,674 | Whittsett | Jan. 9, 1934 |
| 2,046,521 | Mahaffey | July 7, 1936 |
| 2,244,800 | Pascale | June 10, 1941 |
| 2,256,393 | Klein | Sept. 16, 1941 |
| 2,389,400 | Woods | July 12, 1942 |
| 2,318,233 | Keller | May 4, 1943 |
| 2,320,870 | Johnson | June 1, 1943 |
| 2,394,513 | Chappdelaine | Feb. 5, 1946 |
| 2,469,480 | Sikorsky | May 10, 1949 |

FOREIGN PATENTS

| Number | Country | Date |
|---|---|---|
| 97,141 | Sweden | Oct. 7, 1934 |
| 525,452 | Great Britain | Aug. 28, 1940 |
| 837,466 | France | Nov. 12, 1938 |